United States Patent [19]
Nazarian et al.

[11] Patent Number: 6,122,133
[45] Date of Patent: Sep. 19, 2000

[54] HYBRID METHOD OF DETERMINING A FRACTIONAL TRACK POSITION OF A READ TRANSDUCER IN A HARD DISK DRIVE

[75] Inventors: Ara W. Nazarian, Tustin; Brian Tanner; Richard K. Wong, both of San Jose, all of Calif.

[73] Assignee: Western Digital Corporation, Irvine, Calif.

[21] Appl. No.: 09/099,485

[22] Filed: Jun. 17, 1998

[51] Int. Cl.⁷ ............................................. G11B 5/596
[52] U.S. Cl. ................................................ 360/77.08
[58] Field of Search ........................... 360/77.08, 77.02, 360/77.07

[56] References Cited

U.S. PATENT DOCUMENTS

| | | | |
|---|---|---|---|
| 5,381,281 | 1/1995 | Shrinkle et al. | 360/77.08 |
| 5,602,693 | 2/1997 | Brunnett et al. | |
| 5,771,131 | 6/1998 | Pirzadeh | 360/77.08 |
| 5,781,361 | 7/1998 | Le et al. | 360/77.08 |
| 5,825,579 | 10/1998 | Cheung et al. | 360/77.08 |
| 6,002,541 | 12/1999 | Belser et al. | 360/77.08 |

*Primary Examiner*—Paul Loomis
*Assistant Examiner*—Dan I. Davidson
*Attorney, Agent, or Firm*—Milad G. Shara

[57] ABSTRACT

A method used to implement a sampled servo control system in a magnetic disk drive for generating a fractional track portion of a position error signal to correctably maintain the alignment of a read transducer (or associated write transducer) relative to a centerline of one of a plurality of a concentric data tracks upon a rotating data storage disk. The system uses a hybrid approach of determining a fractional track position by using a two-burst algorithm when possible and using a multi-burst algorithm only when necessary. The system is particularly suited to determining fraction track position when jogging a relatively narrow magnetoresistive read transducer with a servo pattern normally useful only for wider transducers, namely a pattern of four angularly sequential servo bursts A, B, C, D that are 100% of a track pitch in width and are arranged in quadrature. In this context, the preferred system reads all four 100% servo bursts and then uniquely selects between a two-burst algorithm and a four-burst algorithm to generate a fractional track position relative to a two-burst centerline (A/B or C/D) or a four-burst centerline (N−Q or N+Q). In general, the servo system selects between the two-burst and the four-burst algorithms based on the transducer's passing through a two-burst zone or a four-burst zone, which preferably overlap, as determined from the relative burst amplitudes of all four servo bursts. When operating at a position in which the zones overlap, the preferred system is biased to select the zone corresponding to the algorithm used during the immediately previous servo sample in order to add stability.

31 Claims, 12 Drawing Sheets

HYBRID METHOD OF DETERMINING A FRACTIONAL TRACK POSITION OF A READ TRANSDUCER IN A HARD DISK DRIVE

FIELD OF THE INVENTION

The invention relates generally to determining a position error signal when jogging a magnetoresistive head in a hard disk drive, and more particularly, to a hybrid approach of determining a fractional track position by using a two-burst algorithm when possible and using a multi-burst algorithm only when necessary.

BACKGROUND OF THE INVENTION

FIG. 1 shows a conventional disk drive 10 which has a hard disk assembly ("HDA"). The HDA includes at least one magnetic disk ("disk") 12 having a plurality of concentric data tracks, a spindle motor 13 for rapidly rotating the disk 12, and a head stack assembly ("HSA") 20.

The HSA 20 includes a transducer head 140 for reading and writing the data onto the magnetic disk 12. The typical HSA 20 further includes an actuator assembly 30 and a head gimbal assembly ("HGA") 100. The head gimbal assembly (HGA) 100 extends from the actuator assembly 30 and biases the head 140 towards the disk 12. The industry presently favors a "rotary" or "swing-type" actuator assembly that move the transducer head 140 in a generally radial manner across the rotating disk 12.

A servo control system moves the actuator assembly 30 to controllably position the transducer head in order to read or write information from or to particular tracks on the disk 12. A flex circuit on the side of the actuator assembly carries read and write signals between a controller 14 and the head 140.

Each data track includes embedded servo data sectors and user data sectors that are alternately located around the track. The servo data comprises track ID fields for identifying data tracks and servo bursts (e.g. A, B) for defining burst pair centerlines.

The system reads the track ID and samples the servo bursts to generate a position error signal (PES) relative to a desired position. The servo system uses the magnitude of the PES to move the actuator assembly 30 of the HSA 20 in order to drive the PES toward zero and thereby achieve or maintain the desired position of the transducer head 140.

In operation, the servo control system moves the transducer head 140 toward a desired data track during a "seek" mode based on the track ID field. Once the transducer head 140 is over the desired track, the servo control system enters a "track follow" mode and uses the servo bursts to keep the transducer head at a desired fractional track position relative to a burst pair centerline.

Older disk drives use an inductive transducer which both reads and writes data onto the disk 12. An inductive transducer drive is usually track following directly on a burst pair centerline except, perhaps, when bumped off track or when settling. Even then, an inductive transducer is usually about 80% of the data track pitch in width and is generally uniformly sensitive across its 80% width such that it can operate ±40% away from the burst pair centerline. An inductive head drive, therefore, often uses a quadrature pattern of four 100% (of track pitch) servo bursts which provides 50% spacing between two- burst pair centerlines.

Newer disk drives use magnetoresistive heads ("MR heads") which have two separate transducers: a magnetoresistive transducer for reading and an inductive transducer for writing. MR heads advantageously support increased a real data density, but suffer from having: (1) an inherent physical separation between the read and write transducers; (2) a smaller average ratio between the width of the read transducer and the data track pitch (about 66% instead of 80%); (3) a relatively wide variance in the width of read transducers about the average (ranging from less than 50% to nearly 100%) which range must often be accommodated due to manufacturing limitations and cost constraints; and (4) a non-linear magnetic response characteristic across the width of the read transducer.

The separation between the read and write transducers causes them to be variably skewed or radially displaced relative to the burst pair centerlines as they are moved from the inside diameter to the outside diameter of the disk. This skew creates a track following problem because positioning is determined by reading the servo bursts with the read transducer even when writing data with the radially displaced write transducer. Because of this skew, the servo control system must read or write while track following away from the burst pair centerline. This process is known as "jogging" and is implemented as a fractional track offset from a servo burst pair centerline. The servo system usually jogs when reading but not when writing because a read operation can always be repeated whereas a write error may cause irreversible damage to neighboring data tracks. In other words, the required jogging offset depends on position for reading, and is always zero for writing. The required jogging offset is usually determined from a lookup table.

As just explained, there is a frequent need to jog the MR read head. The available jogging range, however, is limited by the physical width of the read transducer. As noted above, the magnetoresistive read transducer is relatively narrow, being on average about 66% of a data track pitch wide as compared to 80% for an inductive transducer. The maximum jogging range is one half the physical width, such that for a 66% transducer it is ±33%. A particular read transducer may be even narrower than average, being as narrow as 50% of a track pitch or less. In the case of a 50% transducer, the maximum jogging range is ±25%. Finally, the read transducer's nonlinear response characteristics may further reduce the available jogging range. Under some circumstances of uncompensated nonlinearity, therefore, it may be possible to jog a 50% read transducer only ±20% from a given burst pair centerline before it is necessary to commutate to an adjacent burst pair centerline.

The jogging requirement coupled with the width and linearity related limitations have made it difficult to use a magnetoresistive read transducer with a conventional quadrature pattern of 100% servo bursts because the burst pair centerlines are separated by 50% of a track pitch and only suited, therefore, for a read transducer which can be jogged by at least ±25%. Some members of the drive industry have addressed this problem by using narrow servo bursts to create more closely spaced burst pair centerlines so that a narrow read transducer could effectively commutate to a second adjacent burst pair centerline before being jogged more than 20% away from a first burst pair centerline. One such servo pattern uses four servo bursts that are ⅔ of a track pitch in width and are arranged in quadrature to provide a ⅓, ⅓, ⅓ pattern of burst pair centerlines. Unfortunately, a ⅓, ⅓, ⅓ pattern is relatively expensive in terms of manufacturing because each disk drive must spend more time in the servo track writer.

OBJECTS OF THE INVENTION

It therefore is an object of the present invention to use a quadrature pattern of four 100% servo bursts for jogging a magnetoresistive read transducer.

It is a further object of the present invention to accommodate magnetoresistive read transducers of widely varying width in the context of a quadrature pattern of 100% servo bursts;

It is a further object of the present invention to provide a fractional track position signal that is stable at all jogging offsets including regions of commutation between adjacent burst group centerlines.

SUMMARY OF THE INVENTION

The invention may be regarded as a method for repeatedly determining a fractional track position of a read transducer in a sampled servo magnetic disk drive for maintaining alignment of the read transducer relative to a centerline of one of a plurality of a concentric data tracks upon a rotating data storage disk, comprising the steps of: reading a plurality of angularly sequential servo bursts that are differently radially spaced with respect to a concentric data track; calculating a first fractional track position using a first algorithm based on a first plurality of the angularly sequential servo bursts; determining whether to retain the first fractional track position; and calculating a second fractional track position using a second algorithm based on a second greater plurality of the servo bursts if the first fractional track position is not retained.

The invention may be further regarded as a disk drive comprising: a base; a data disk having a plurality of concentric data tracks; a transducer head assembly including a read transducer; a sampled servo control system for moving the transducer head over the data disk relative to the concentric data tracks; a plurality of angularly sequential servo bursts on the data disk comprising four angularly sequential servo bursts A, B, C, D that are each 100% of a track pitch in width and are radially arranged in a 100% quadrature servo pattern wherein two of the servo bursts A, B are equally radially disposed on either side of a "normal" two-burst centerline A/B that is substantially aligned with the centerline of a concentric data track and two of the servo bursts C, D are equally radially disposed on either side of a "quadrature" two-burst centerline C/D that is substantially offset from the centerline of the concentric data track by 50% of a track pitch; two-burst means for calculating a fractional track position with a first algorithm using only two of the four servo bursts A, B or C, D; four-burst means for calculating a fractional track position with a second algorithm using all four servo bursts A, B, C, D; means for dividing a repeating portion of the 100% quadrature servo pattern into a plurality of two-burst zones in which the fractional track position is calculable by the two-burst algorithm using only two bursts and a plurality of four-burst zones in which the fractional track position is calculable by the four-burst algorithm using all four bursts; means for determining which zone was read by the read transducer based on relative values of the four servo bursts A, B, C, D; and means for selecting between the two-burst and four-burst means for calculating based on which zone was determined to be read by the read transducer.

The invention may further be regarded as a method of determining a fraction track position of a read transducer in a disk drive using a repeating pattern of four angularly sequential servo bursts A, B, C, D that are radially arranged in a 100% quadrature servo pattern wherein two of the servo bursts A, B are equally radially disposed on either side of a "normal" two-burst centerline A/B that is substantially aligned with the centerline of a concentric data track and two of the servo bursts C, D are equally radially disposed on either side of a "quadrature" two-burst centerline C/D that is substantially offset from the centerline of the concentric data track by 50% of a track pitch, the method comprising the steps of: reading four servo bursts A, B, C, D for use in calculating a two-burst fractional track position relative to a two-burst centerline and in calculating a four-burst fractional track position relative to a four-burst centerline; using a two-burst fractional track position to position the read transducer if the two-burst fractional track position is less than a limit value; and using a four-burst fractional track position to position the read transducer if the two-burst fractional track position is greater than the limit value.

BRIEF DESCRIPTION OF THE DRAWINGS

The just summarized invention may be best understood by reviewing the detailed description in view of the following drawings.

DETAILED DESCRIPTION OF THE INVENTION

Figure 1:
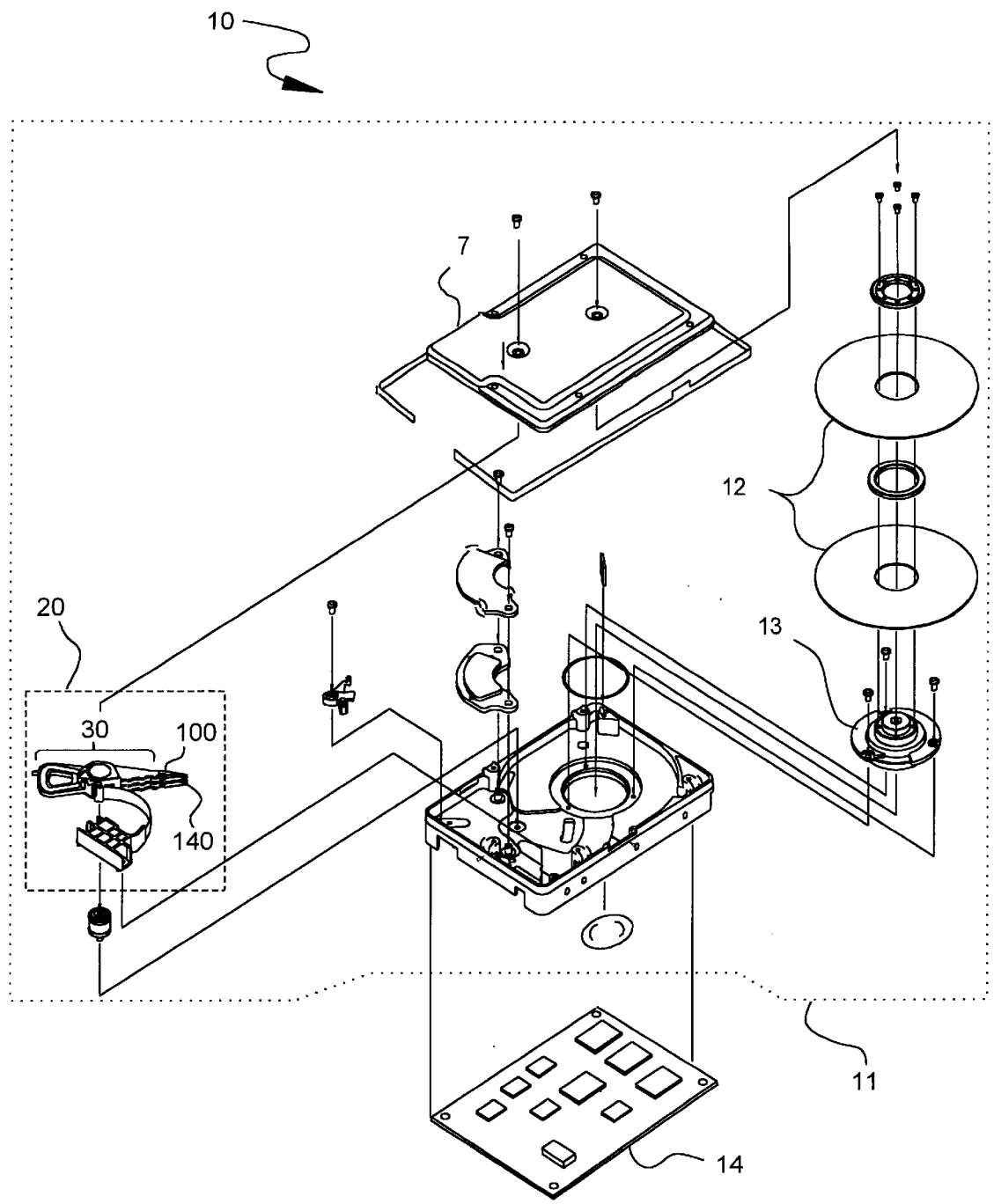
FIG. 1 shows a disk drive that uses the present invention.
Figure 2:
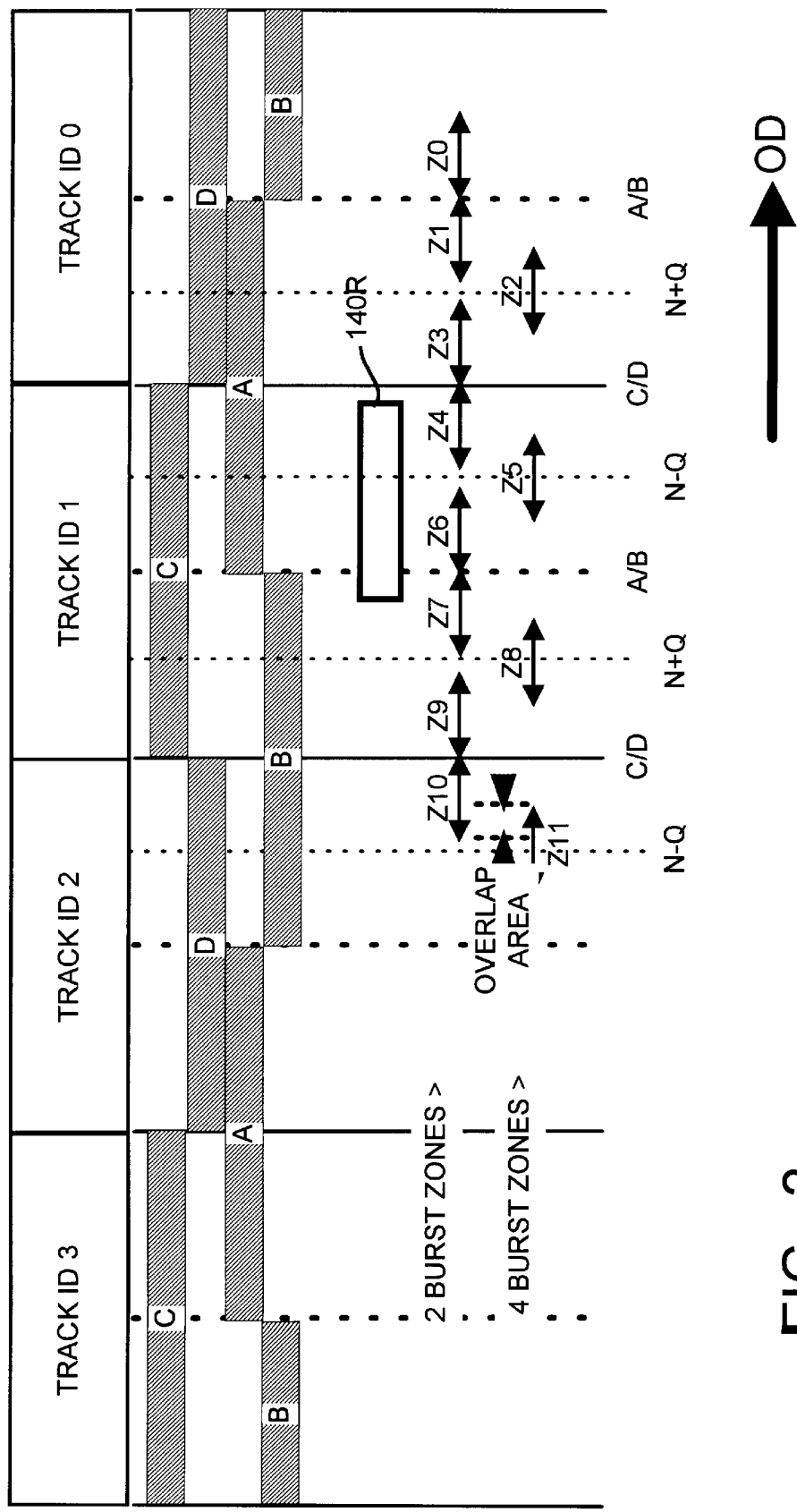
FIG. 2 shows the track ID fields and preferred four-burst servo pattern of servo bursts used in the disk drive of FIG. 1 and how this invention divides a repeating portion of the servo pattern into twelve operating zones $z0$ to $z11$.

FIG. 2 shows a servo burst pattern that was commonly used with relatively wide inductive heads that did not have a jogging requirement. The pattern comprises four radially repeating, angularly sequential servo bursts A, B, C, D that are 100% of a track pitch in width and are arranged in quadrature (sometimes hereafter a "100% quadrature pattern"). The illustrated burst pattern is normally viewed as comprising two alternating pluralities of burst pairs A/B and C/D which respectively define alternating pluralities of "normal" and "quadrature" burst pair centerlines (sometimes hereafter called "two-burst centerlines"). The burst pair centerlines are separated by 50% of a track pitch. Accordingly, the 100% quadrature pattern was previously considered impractical for jogging a relatively narrow magnetoresistive read transducer and was largely replaced by the more expensive ⅓, ⅓, ⅓ pattern for that purpose.

The present invention offers a "hybrid" approach to measuring position that makes it surprisingly practical to use a magnetoresistive read transducer with the 100% quadrature pattern of FIG. 2. In particular, during a servo interrupt, the present invention reads all four 100% servo bursts and then uniquely selects between a two-burst algorithm and a four-burst algorithm to generate a fractional track position relative to a two-burst centerline or a four-burst centerline. In general, the servo system selects between the two-burst and the four-burst algorithms based on the transducer's currently measured position as determined from the relative burst amplitudes of all four servo bursts.

It is possible to always determine the fractional track position with the four-burst algorithm and all four servo bursts, but the determination would be less accurate than possible with a two-burst algorithm. Thus, the present invention preferably uses a two burst algorithm when possible and uses a four-burst algorithm only when necessary.

This servo system can control a read transducer at various jogging offsets in the context of a relatively inexpensive, quadrature pattern of four 100% servo bursts A, B, C, D, provided that the transducer can read all four bursts. Apparently, therefore, the transducer must be at least as wide as 50% of a track pitch so as to physically embrace all four bursts. The inventors have discovered, however, that the system can reasonably control even a sub-50% read transducer that does not physically pass over all four burst because of inherent side-reading characteristics.

General Operation

Figure 3:
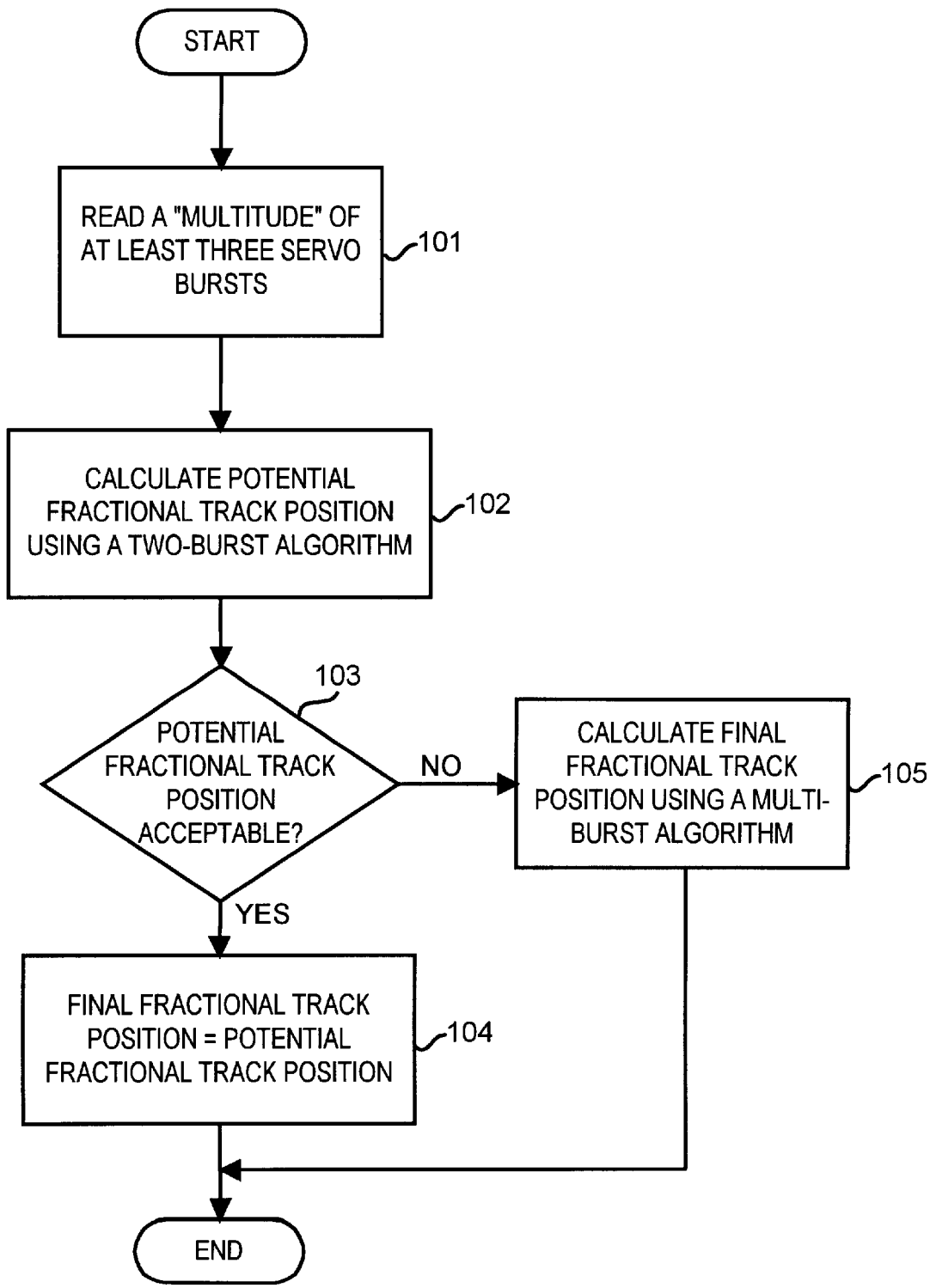
FIG. 3 is a general flow chart of this invention for use with a servo pattern formed from three or more angularly sequential servo bursts.

The present invention preferably uses a 100% quadrature pattern of exactly four servo bursts as shown in FIG. 2. This invention, however, may theoretically operate with a pattern of three, four, five, or more, angularly sequential servo bursts. FIG. 3, in this regard, is a flow chart that offers a broad overview of the present invention with respect to any servo pattern having a multitude of servo bursts wherein "multitude" and "multi" are defined herein to mean three or more bursts. At step 101, the servo system reads the multitude of servo bursts with the read transducer. At step 102, the servo system uses a two-burst algorithm to calculate a potential fractional track position relative to an ordinary two-burst centerline by using less than all of the multitude of servo bursts. A two-burst position is generally best if the transducer is near the two-burst centerline and therefore, reads approximately equal portions of the two bursts. The fractional track offset determined with the two-burst algorithm is only "potential", however, because it may be supplanted by a fractional track position determined relative to an adjacent multi-burst centerline defined by a multi-burst algorithm and using a multitude of bursts. At step 103, the servo system applies a "retention criteria" to determine if the fractional track position developed with the two-burst algorithm will be accepted or replaced. If yes, at step 104, the potential fractional track position becomes the final fractional track position. If no, at step 105, the servo system uses a multi-burst algorithm to calculate a final fractional track position.

Figure 4:
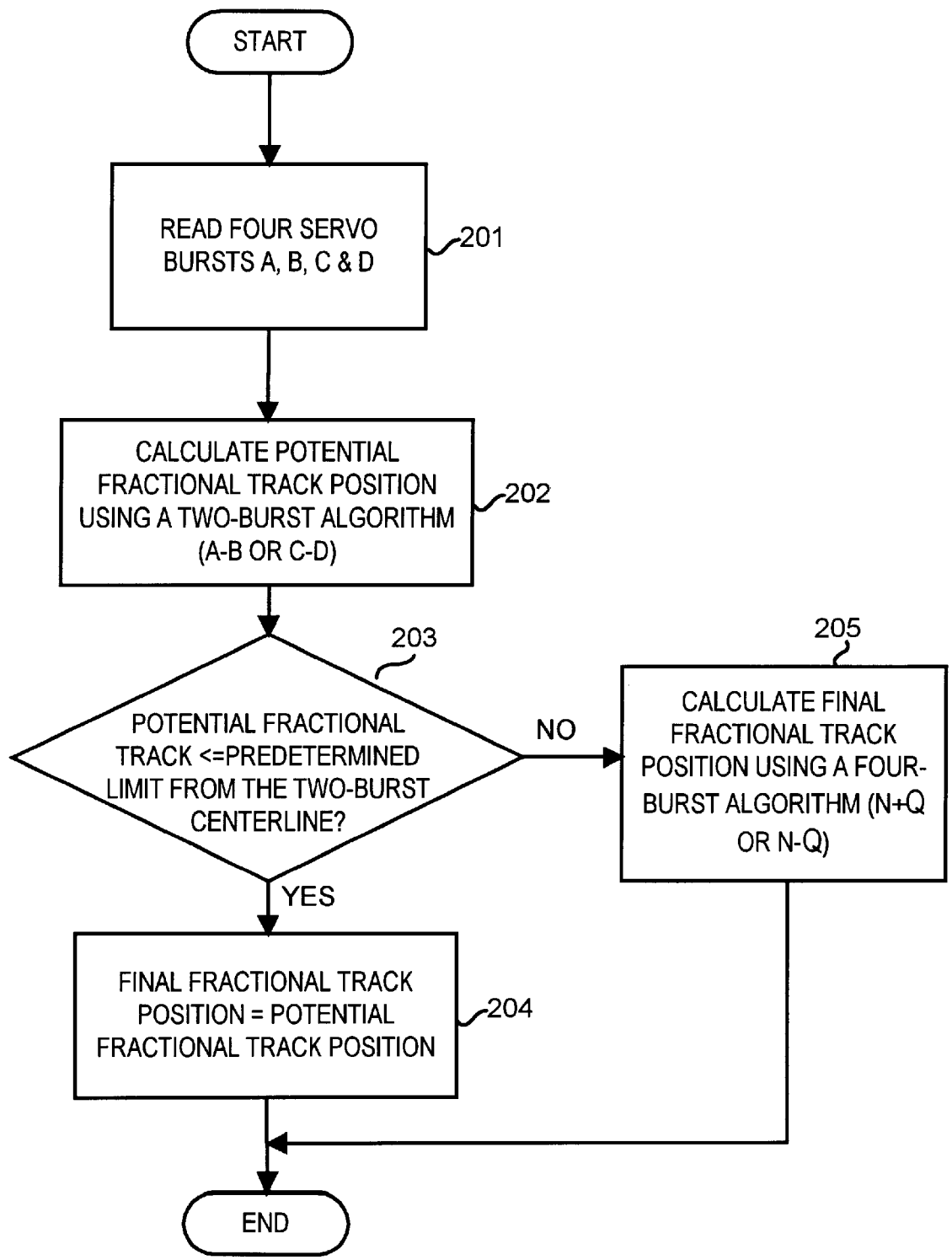
FIG. 4 is a high-level flow chart of a preferred embodiment of this invention for use with the four-burst servo pattern of FIG. 2.
Figure 5A:
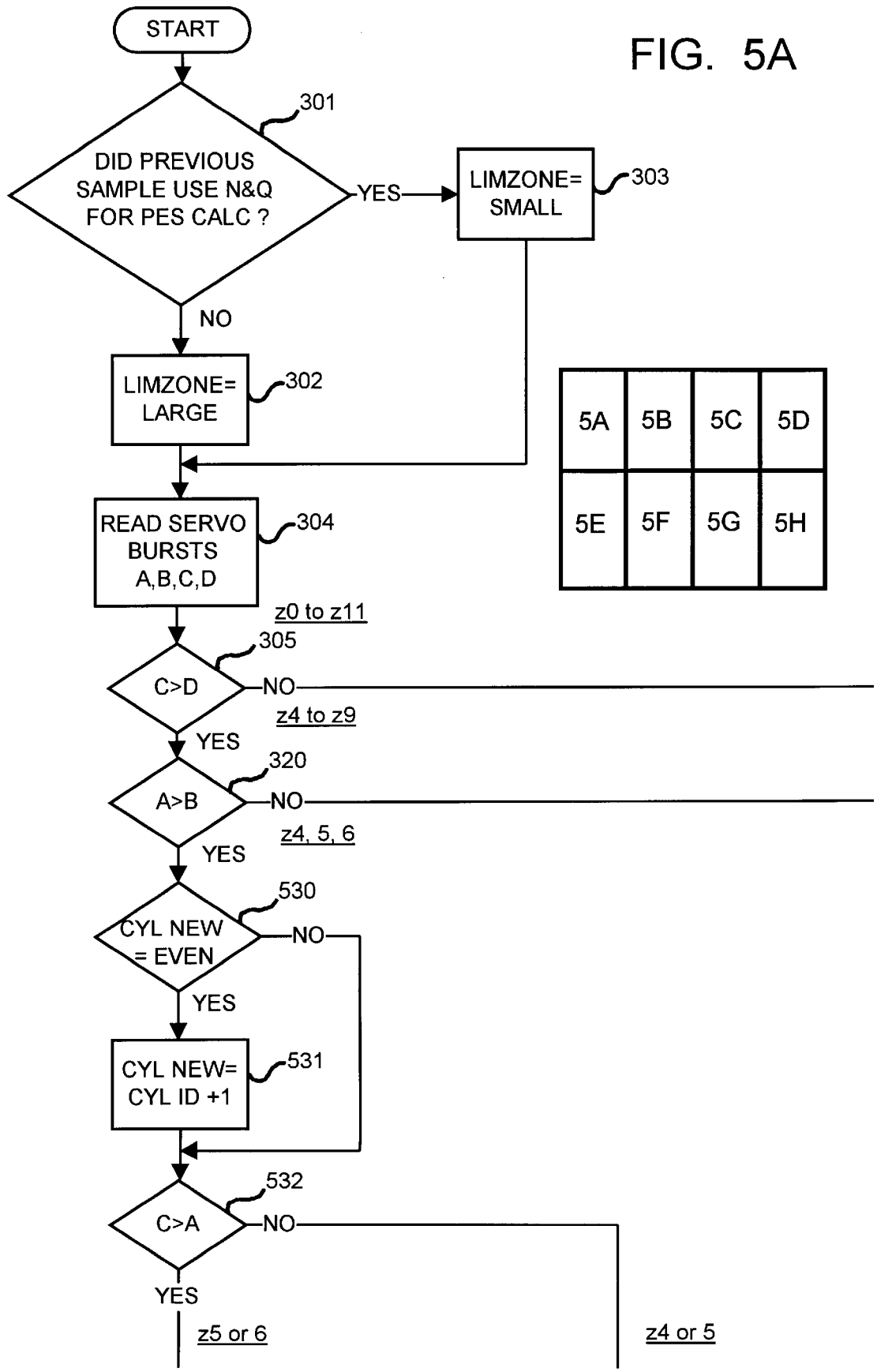
FIGS. 5A–H (spanning eight pages) is a detailed flow chart of the preferred embodiment.
Figure 5B:
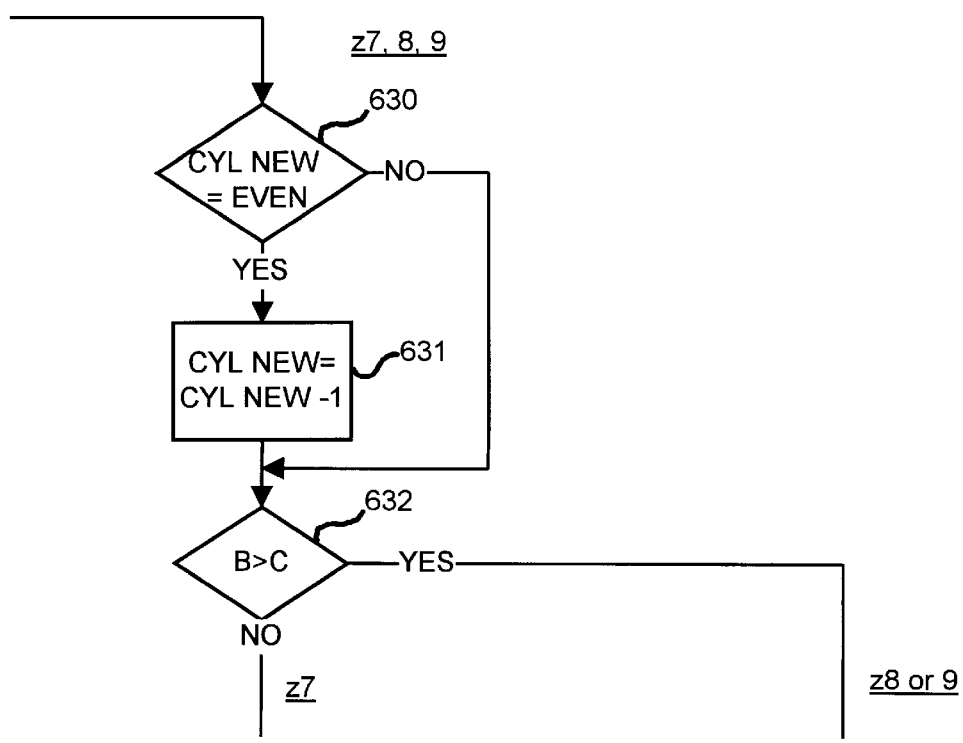
Figure 5C:
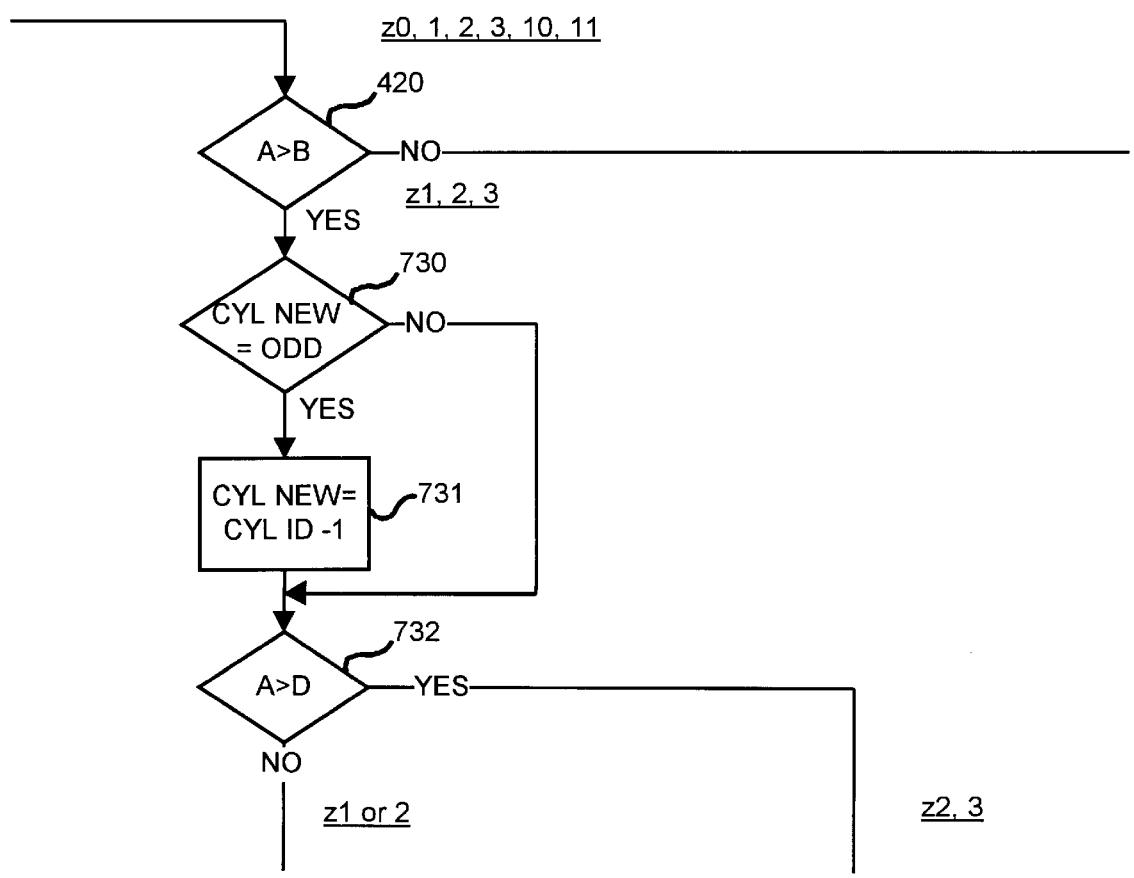
Figure 5D:
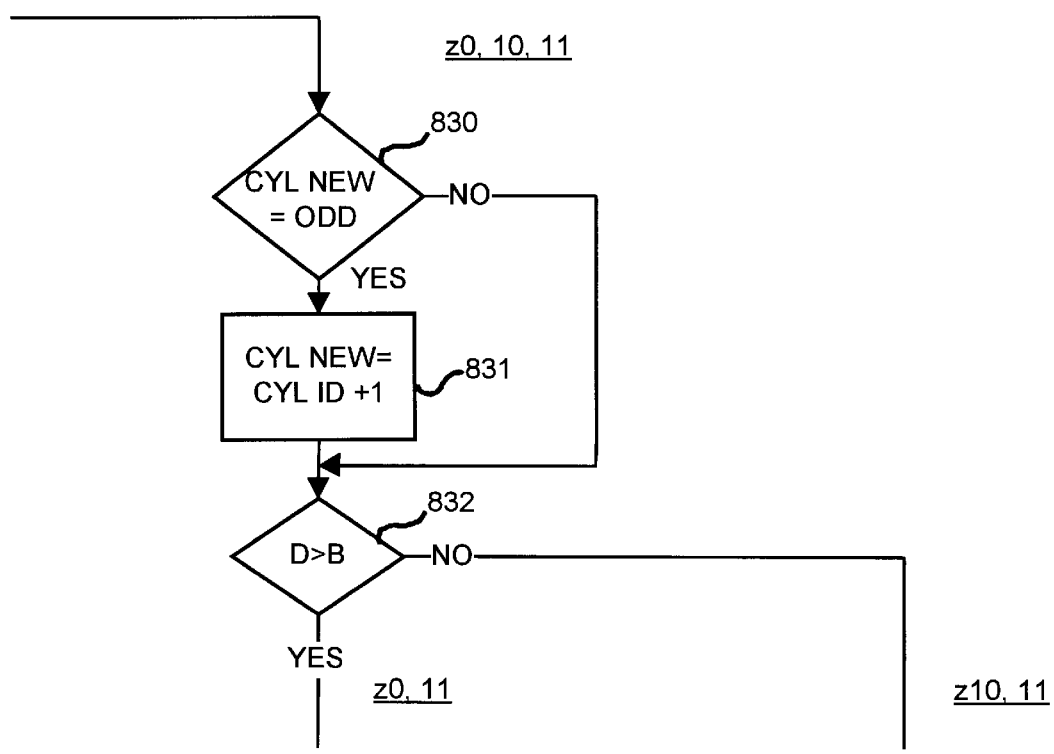
Figure 5E:
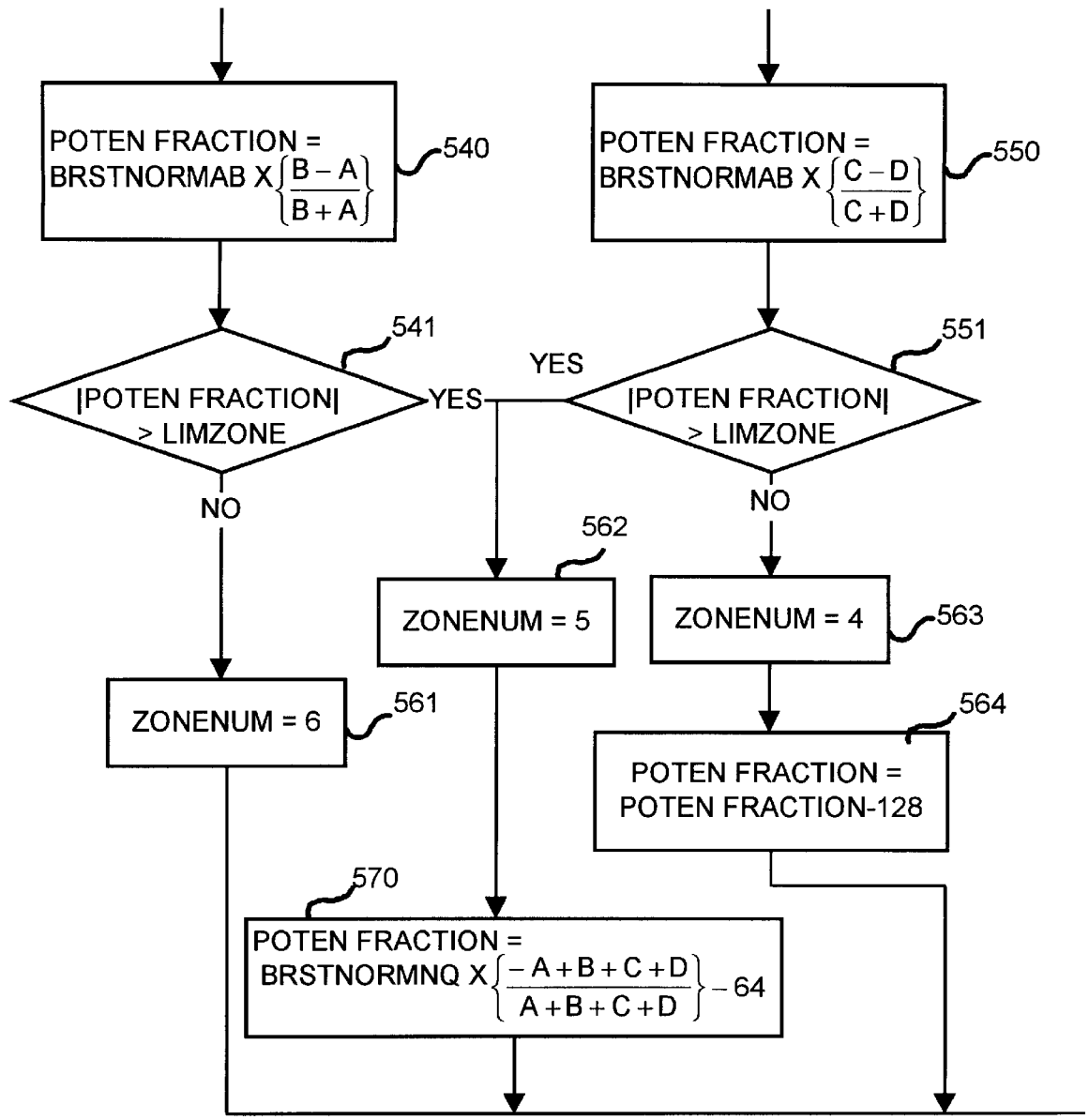
Figure 5F:
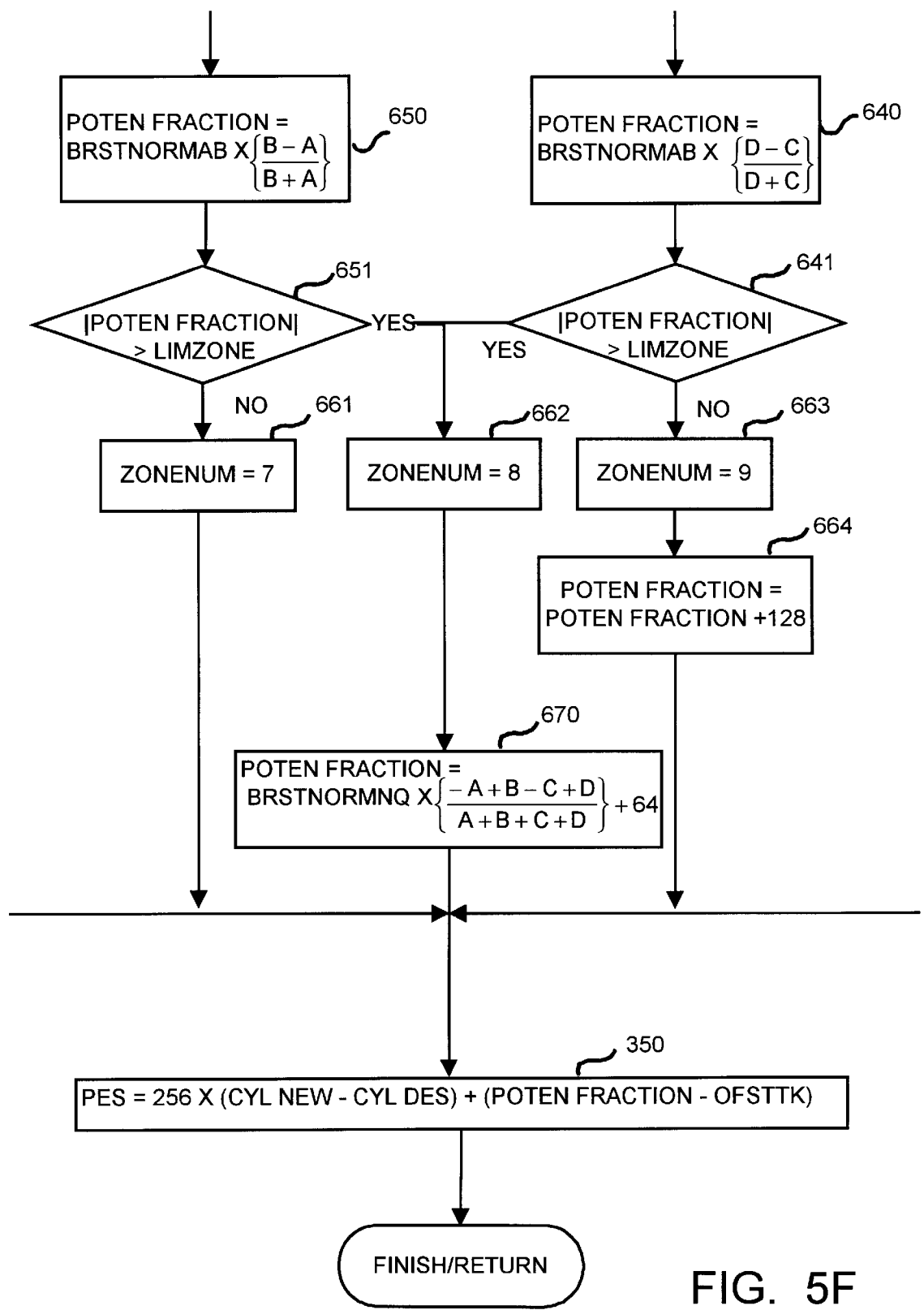
Figure 5G:
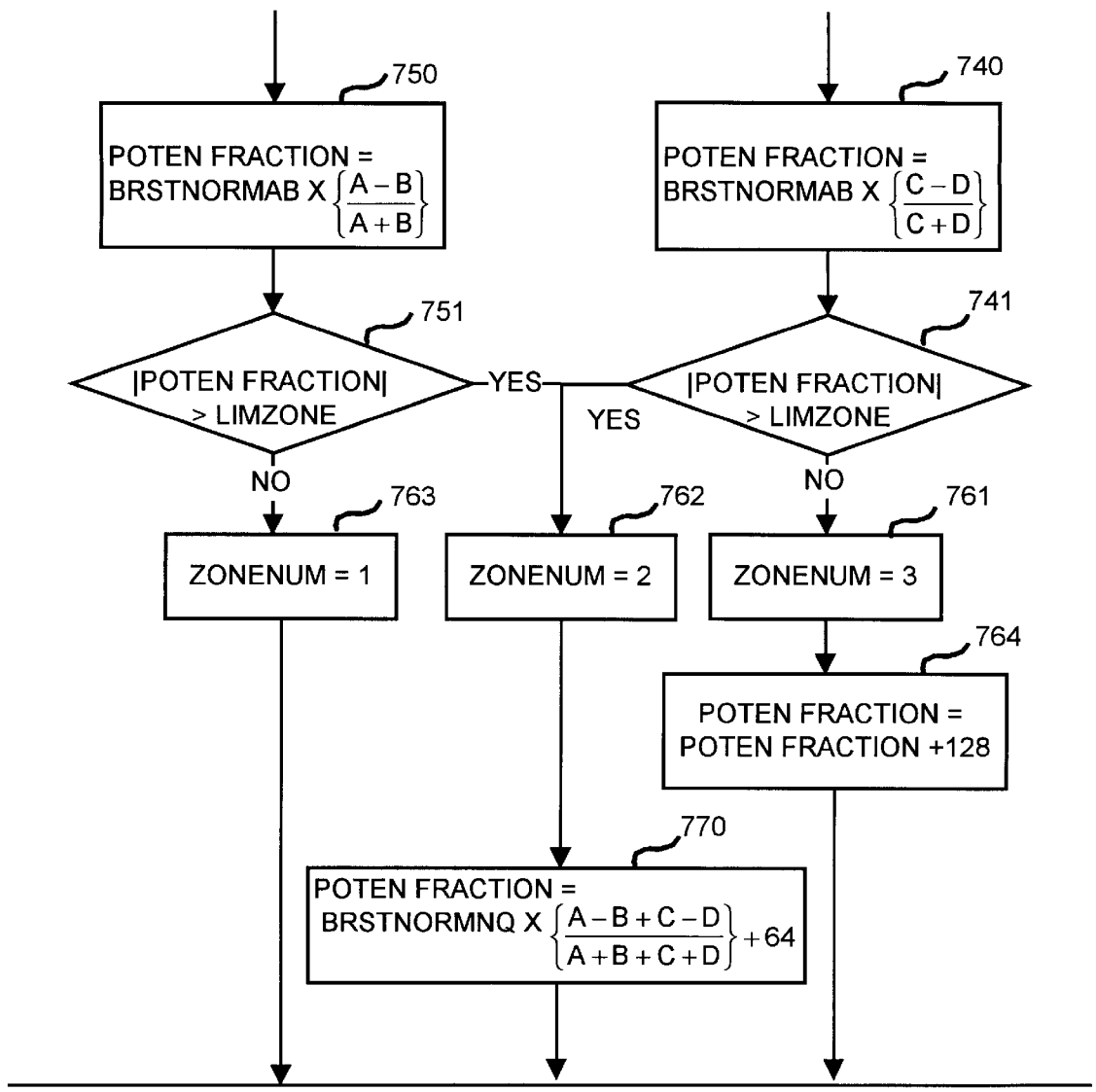
Figure 5H:
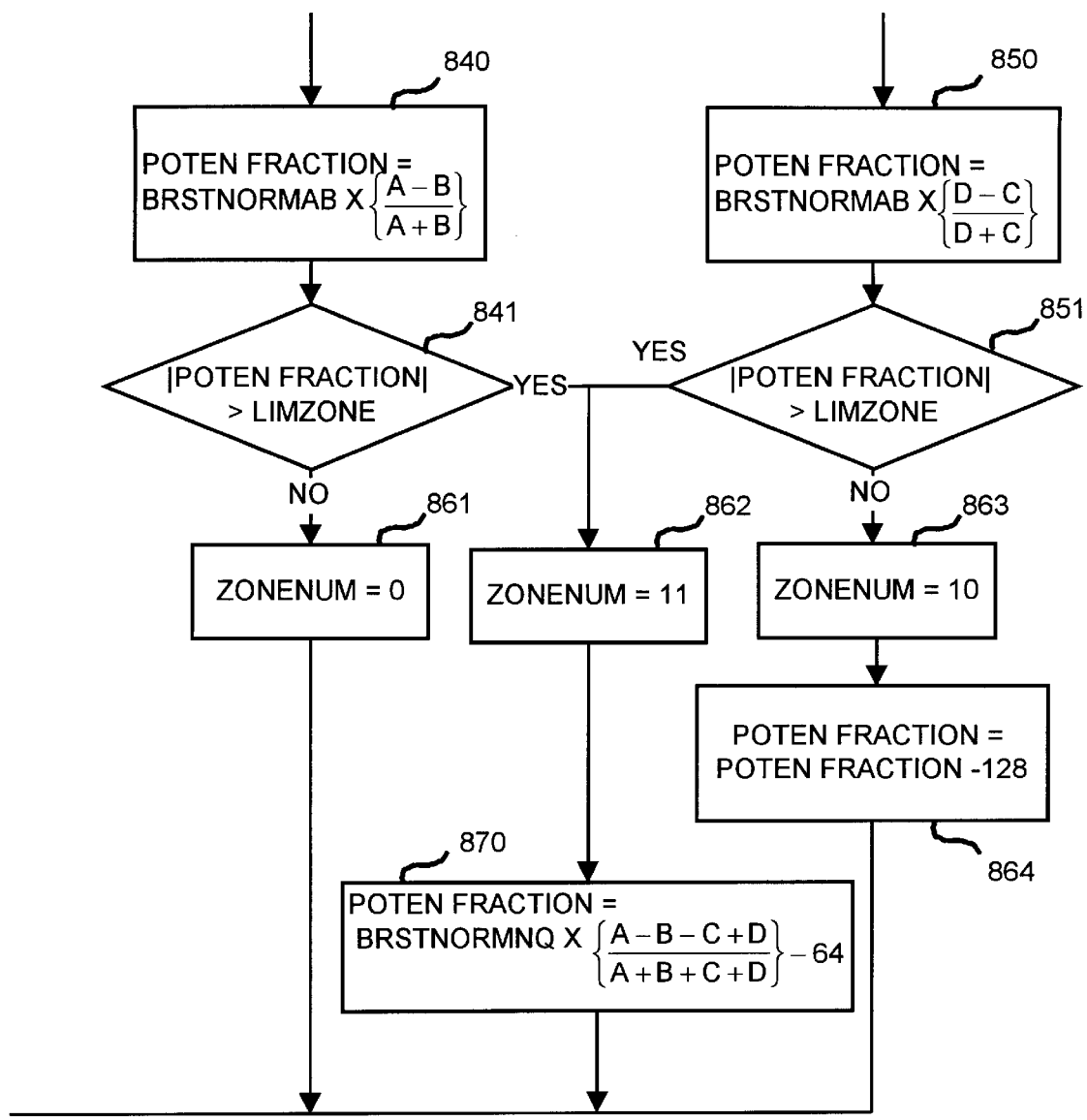

FIG. 4 is a flow chart that offers a broad overview of a presently preferred embodiment of the invention designed specifically for the 100% quadrature pattern of FIG. 2. The subject pattern has four bursts. At step 201, the servo system reads all four 100% servo bursts A, B, C, and D. At step 202, the servo system uses a two-burst algorithm to calculate a potential fractional track position relative to an ordinary two-burst centerline. In this particular case, the two-burst algorithm provides a potential fractional track position relative to a "normal" A/B centerline or a "quadrature" C/D centerline, whichever is nearer. At step 203, with regard to a "retention criteria" like that generally referenced above in connection with step 103, the servo system determines if the read transducer's displacement from the nearby two-burst centerline is within a predefined limit. If yes (the read transducer is inside the limit), at step 204, the potential fractional track position becomes the final fractional track position. If no (the read transducer is outside the limit), at step 205, the servo system uses a four-burst algorithm to calculate a final fractional track relative to an N+Q or N−Q centerline, whichever is nearer, where N=A−B and Q=C−D.

Detailed Operation

The preferred system will now be described in more detail with continued reference to FIG. 2 which, in addition to showing a conventional 100% quadrature pattern, shows how this invention defines a plurality of two-burst centerlines and four-burst centerlines and how this invention divides a repeating portion of the servo pattern into twelve zones z0 to z11 for use in preferentially selecting a two-burst centerline and alternatively selecting a four-burst centerline for determining the fractional track position of the read transducer. As shown, the preferred servo system divides the available transducer positions into twelve repeating "zones" z0 to z11 having position ranges that are represented by appropriately numbered arrows. For clarity, the zones are illustrated in "upper" and "lower" rows based on their two-burst versus four-burst characteristic. The upper zones z0, z1, z3, z4, z6, z7, z9, and z10 represent positions that are near the conventional two-burst centerlines where, ideally, the read transducer is controlled with a two-burst algorithm. The lower zones z2, z5, z8, and z11 represent positions that are between the conventional two-burst centerlines, near the four-burst centerlines provided by this invention, where the read transducer, if necessary, is controlled by a four-burst algorithm. The zones could theoretically have abrupt boundaries. As emphasized with the dashed lines connecting zones z10 and z11 and as described more fully below, however, each two-burst zone z0, z1, z3, z4, z6, z7, z9, and z10 preferably overlaps an adjacent one of the four-burst zones z2, z5, z8, or z11 so that the "limit" in steps 203 of FIG. 4 may be dynamically shifted to provide some hysteresis that prevents the system from jumping back and forth between algorithms when the transducer is operating at the interface between a two-burst zone and a four-burst zone.

FIG. 5, implemented over eight pages as FIGS. 5A–5H, is a detailed flow chart showing the operation of the preferred servo system which uses a four burst, 100% quadrature pattern that is divided into twelve zones z0 to z11 as shown in FIG. 2.

Steps 301 to 303 relate to varying the "limit" in order to provide hysteresis as first discussed above with respect to step 203 in the general flow chart of FIG. 4. In this embodiment, the limit is always measured relative to a nearby two-burst centerline. At step 301, the servo system determines whether the fractional track position from the previous servo sample was derived with a four-burst algorithm (N−Q or N+Q), or a two-burst algorithm (A−B or C−D). If NO (the last fractional track position was derived with a two-burst algorithm), then a limit value LIMZONE is set to a relatively large value at step 302 (around 16% of a track pitch) in order to broaden the two-burst zone and thereby make it more likely that the system will again use a use a two-burst algorithm on this servo sample. If YES (the last fractional track position was derived with a four-burst algorithm), then LIMZONE is set to a relatively small value at step 303 (around 10% of a track pitch) in order to broaden the four-burst zone and thereby make it more likely that the system will use a use a four-burst algorithm once again on this servo sample. The limit value LIMZONE is used in decision steps 541, 551, 641, 651, 741, 751, 841, and 851 discussed below.

At step 304, the servo system reads all four 100% servo bursts A, B, C, and D and stores the values in appropriate registers. At this point, the system has a tentative track ID CYLNEW (not explicitly shown in FIG. 5 but note the track ID field at the top of FIG. 2), but it assumes that the read transducer could be in any one of the twelve zones z0 to z11 shown in FIG. 2. The system now makes several successive comparisons to eliminate candidate zones and ultimately determine the occupied zone.

At step 305, the servo system compares the relative magnitude of servo bursts C and D because these are the first bursts read by the transducer. If C is greater than D (C>D=

YES), then the system proceeds to step 320 "knowing" that the read transducer is in one of zones z4 to z9 since these six zones (sometimes hereafter "C-zones") are aligned with the C bursts of FIG. 2. If D is greater than C (C>D=NO), then the system proceeds to step 420 knowing that the read transducer is in one of zones z0, z1, z2, z3, z10 or z11 (sometimes hereafter "D-zones") since these six zones are aligned with the D bursts of FIG. 2.

At steps 320 or 420, as the case may be, the servo system compares the relative magnitude of servo bursts A and B to further narrow the list of candidate zones. If A is greater than B (A>B=YES) in step 320, for example, then the servo system proceeds to step 530 knowing that the transducer is positioned to the outside (right) half of the C-zones in one of zones z4, z5, or z6. If NO, then the system proceeds to step 630 knowing that the transducer is positioned to the inside (left) half of the C-zones in one of zones z7, z8, or z9. The system operates from step 420 in a similar fashion to proceed to step 730 with candidate zones to z1, z2 or z3 or to step 830 with candidate zones z0, z10, or z11.

At steps 530, 630, 730, and 830, as the case may be, the system determines whether or not the new cylinder CYL-NEW that was tentatively identified only by the track ID field is odd or even and either does nothing or corrects CYLNEW. It is desirable to correct the new cylinder CYL-NEW by ±1 unit because the track ID may be ambiguous by one bit since the transducer often passes over part of two adjacent track ID fields and such fields are customarily encoded with a gray code that varies by one bit from cylinder to cylinder. These steps are best understood by noting from FIG. 2 that the C bursts are associated only with odd cylinders (e.g. ID1 and ID3) and that the D bursts are associated only with even cylinders (e.g. ID0 and ID2). From previous step 305, the system knows whether the track ID should be odd or even based on whether the transducer passed over an "odd" C bursts or an "even" D burst. If CYLNEW is odd or even as expected in Steps 530, 630, 730, or 830, as the case may be, then the system skips to steps 532, 632, 732, or 832, respectively, without changing CYLNEW. If CYLNEW is the opposite of what is expected in expected in Steps 530, 630, 730, or 830, however, the system proceeds to steps 531, 631, 731, or 831, respectively, and either increments or decrements CYLNEW to change it from odd to even, or vice versa. The system knows whether to increment or decrement from having passed through one of the previous steps 320 or 420 which respectively indicated whether the transducer was to the inside or outside of an even C burst or to the inside or outside of an odd D burst. In step 531, for example, the system knows that the transducer passed over an "odd" C burst associated with cylinder #1, or #3, and so on, and that the transducer passed over the outside (right) half of the C burst and, therefore, closer to a lower numbered even cylinder than to a higher numbered even cylinder. Accordingly, if CYLNEW is erroneously even, the system makes CYLNEW odd by adding one unit rather than subtracting one unit. Steps 631, 731, and 831 operate in a similar manner and need not be described further.

At steps 532, 632, 732, and 832, as the case may be, the servo system compares the relative magnitude of servo bursts C and A, B and C, A and D, and D and B to further narrow the list of candidate zones from three to only two, a four-burst zone and a two-burst zone. In essence, the servo system determines whether the transducer is to the inside (left) or outside (right) of the four-burst centerlines associated with zones z5, z8, z2, and z11, respectively. In step 532, for example, the servo system compares the relative magnitude of servo bursts C and A. If C is greater than A (C>A=YES) in step 532, then the servo system proceeds to step 540 knowing that the transducer is positioned to the inside (left) of zone z5's four-burst centerline such that it is either in the inside half of zone z5 or in zone z6. If A is greater than C (C>A=NO) in step 532, the system proceeds to step 550 knowing that the transducer is positioned to the outside (right) half of zone z5's four-burst centerline such that it is either in the outside (right) half of zone z5 or in zone z4. The system operates from step 632, 732, and 832 in a similar fashion to proceed to steps 640 or 650, 740 or 750, and 840 or 850, respectively.

In steps 540 or 550, 640 or 650, 740 or 750, and 840 or 850, as the case may be, the system uses a two-burst algorithm to derive a potential fractional track position POTEN_FRACTION relative to one of the two-burst centerlines A/B or C/D. The system uses an algorithm based on A–B if the transducer is closer to an A/B centerline and an algorithm based on C–D if it is closer to a C/D centerline. In reaching step 540, for example, the system knows the transducer is in the inside (left) half of zone z5 or in zone z6 such that it is closer to the A/B centerline. In step 540, therefore, the system assumes the read transducer is now in the two-burst zone z6 and applies the following two-burst formula involving A–B to derive the potential fractional track position:

$$\text{POTEN\_FRACTION} = \text{BRST\_NORM\_AB} \times -\frac{A-B}{A+B}$$

The burst normalization value BRST_NORM_AB is a calibration factor relating to ensuring that the system reads zero "counts" when the transducer is not over a burst and full scale (256 "counts" in the preferred system) when the transducer is completely over a burst. The negative sign is representative of the fact that the A burst is to the outside (right) of the B burst for odd tracks (as here) and to the inside (left) of the B burst on even tracks. Steps 550, 640 or 650, 740 or 750, and 840 or 850 derive a potential fractional track position in a similar fashion and will not be described for the sake of brevity.

The {brackets} in the flowchart of FIG. 5, e.g.

$$\left\{\frac{B-A}{B+A}\right\}$$

in Step 540, are included to suggest that the quotient values may be adjusted from their nominal values to compensate for magnetic nonlinearities across the width of the read transducer. There are many known ways of implementing such linearization using mathematical algorithms or indexed lookup tables In either case, linearization parameters or table values are generally determined during a manufacturing phase known as "Intelligent Burn-In" (IBI). One possible linearization method is disclosed in prior commonly assigned application Ser. No. 08/893,815 that was filed by Nazarian et al. on Jul. 11, 1997, entitled "Self-PES Linearity Calibration Method," and is fully incorporated herein by reference. The quotient values may also be adjusted to provide any offset needed to adjust the fractional track position so that the two-burst centerlines A/B and C/D appear to be 50% of a track pitch away from each other.

At each of steps 541 and 551, 641 and 651, 741 and 751, 841 and 851, as the case may be, the system compares the absolute value of the potential fractional track position POTEN_FRACTION with the limit value LIMZONE set relatively narrow or relatively wide at the start of this process in steps 301 to 303 so that the system tends to choose the same type of zone as was chosen in the last sample. The system makes this comparison in order to select between the final two candidates, a four-burst zone and an adjacent two burst zone. Starting from step 541, for example, the candidates are zones z6 and z5, and starting from step 551 the two candidates are zones z5 and z4. Note that the intermediate four-burst zone z5 is a candidate in both cases. If the absolute value of the potential fractional track position POTEN_FRACTION is less than the limit value LIMZONE in step 541, the servo system proceeds to step 561 and selects the two-burst zone z6. If, on the other hand, the absolute value of the potential fractional track position POTEN_FRACTION is greater than the limit value LIMZONE in step 541, the servo system proceeds to step 562 and selects the four-burst zone z5. Similarly speaking, starting from step 551, the system proceeds to step 562 and selects the four-burst zone z5 or to step 563 and selects the two-burst zone z4. Steps 641, 651, 661, 662, and 663 operate in a similar fashion to select between zones z9 and z8 or z8 and z7. Steps 741, 751, 761, 762, and 763 operate in a similar fashion to select between zones z3 and z2 or z2 and z1. Finally, steps 841, 851, 861, 862, and 863, operate in a similar fashion to select between zones z0 and z11 or z11 and z10.

In the case of a two-burst zone that is retained, i.e. if the absolute value of the potential fractional track position POTEN_FRACTION derived from a two-burst algorithm is less than the limit value LIMZONE in any of steps 541, 551, 641, 651, 741, 751, 841, and 851, as the case may be, no further calculation is necessary other than to possibly adjust POTEN_FRACTION for having been developed with C/D rather than A/B. For example, if the system arrives at step 563 in connection with being in the two-burst zone z4, we know that the system derived the potential fractional track position POTEN_FRACTION from "quadrature" bursts C and D in step 550. Accordingly, the system proceeds to step 564 and adjusts POTEN_FRACTION up or down by 50% of a track pitch (128 "counts") as appropriate (down in this case). Steps 664, 764, and 864 operate in a similar manner.

At steps 570, 670, 770, and 870, i.e. if the system "rejected" a two-burst algorithm and determined that the transducer is better viewed as being in one of the four-burst zones z5, z8, z2 or z11, respectively, the system uses a four-burst algorithm to derive a "final" fractional track position POTEN_FRACTION relative to a four-burst centerline N−Q or N+Q that bisects the subject four-burst zone. In reaching step 570, for example, the system knows the transducer is in the four-burst zone z5 and nearer to the four-burst centerline N−Q that bisects zone z5 than to the A/B centerline that is adjacent to the two-burst zone z6. In step 570, therefore, the system applies the following four-burst formula involving N and Q (where N=A−B and Q=C−D) to derive the "final" potential fractional track position:

$$\text{POTEN\_FRACTION} = \text{BRST\_NORM\_NQ} \times -\frac{N-Q}{A+B+C+D} - 64$$

$$= \text{BRST\_NORM\_NQ} \times -\frac{(A-B)-(C-D)}{A+B+C+D} - 64$$

$$= \text{BRST\_NORM\_NQ} \times -\frac{-A+B+C-D}{A+B+C+D} - 64$$

The burst normalization value BRST_NORM_NQ is again a calibration factor and the negative sign is again representative of the fact that N−Q has opposite polarities for odd and even tracks (as does N+Q). The "−64" adjustment accounts for the fact that the four-burst centerline N−Q which bisects the four-burst zone z5 is 25% of a track pitch (64 "counts") to the outside (right) of the two-burst A/B centerline. Steps 670, 770, and 870 use a four-burst algorithm to derive a "final" fractional track position in a similar fashion and, as with other such steps, will not be described for the sake of brevity.

Moreover, as suggested by the {brackets}, the system preferably implements a linearization process like that discussed above to compensate for magnetic nonlinearities across the width of the read transducer and, in this case, to provide any needed offset to adjust the fractional track position and make the N−Q and N+Q centerlines appear to be 25% of a track pitch away from the two-burst centerlines A/B and C/D.

Finally, in step 350, the system calculates the overall position error signal PES as the sum of the integer track error and the fractional track error where the former is defined as the difference between the current cylinder and the desired cylinder (track), 256×(CYLNEW−CYLDES) in terms of "counts", and where the latter is based on the current fractional track position and the desired fractional track jogging offset (if any), (POTEN_FRACTION−OFSTTK) in terms of "counts." In the preferred embodiment, the demanded fractional track jogging offset OFFSTK is always zero for writing and varies only for reading.

The Preferred Algorithms

The preferred two burst algorithms are based on an A−B formula and a C−D formula. The preferred system substantially implements the two-burst algorithms as (A−B)/(A+B) when the read transducer is near a "normal" two-burst centerline A/B, and as (C−D)/(C+D) when the transducer head is near a "quadrature" two-burst centerline C/D. These algorithms require a divide for self-normalization, but do not require automatic gain control (AGC). Given AGC, however, the system could use K(A−B) and K(C−D) where K is an AGC scaling factor that is updated at the start of each servo sample with a leading AGC field.

The preferred four-burst algorithms are based on an N−Q formula and an N+Q formula where N=A−B and Q=C−D. They are, in other words, the sum and difference of the "normal" A−B signal and the "quadrature" C−D signal. Accordingly, the four burst algorithms could be substantially implemented as $$\frac{A-B}{A+B} - \frac{C-D}{C+D} \text{ and } \frac{A-B}{A+B} + \frac{C-D}{C+D}.$$

This approach, however, detrimentally requires two divides. The preferred implementation of the four-burst algorithms requires the same number of divides as the two-burst versions—one. The preferred four-burst algorithms are substantially implemented as $$\frac{(A-B)-(C-D)}{A+B+C+D} \text{ and } \frac{(A-B)+(C-D)}{A+B+C+D}.$$

Those skilled in the art will appreciate that various adaptations and modifications of the just described preferred embodiment can be used and configured without departing from the scope and spirit of the invention. Therefore, it is to be understood that, within the scope of the appended claims, the invention may be practiced other than as specifically described herein.

What is claimed is:

1. A method for repeatedly determining a fractional track position of a read transducer in a sampled servo disk drive for maintaining alignment of the read transducer relative to a centerline of one of a plurality of concentric data tracks upon a rotating data storage disk, comprising the steps of:

reading a plurality of angularly sequential servo bursts that are differently radially spaced with respect to a concentric data track;

calculating a first fractional track position using a first algorithm based on a first plurality of the angularly sequential servo bursts;

determining whether to retain the first fractional track position; and calculating a second fractional track position using a second algorithm based on a second greater plurality of the servo bursts if the first fractional track position is not retained.

2. The method of claim 1 wherein the step of determining whether to retain the first fractional track position is based upon a value of the first fractional position.

3. The method of claim 2 wherein the step of determining whether to retain the first fractional track position comprises comparing the value of the first fractional position with a limit value.

4. The method of claim 3 further comprising the step of varying the limit value based on which algorithm was used in a previous servo sample in order to increase the likelihood that the method will re-use the same algorithm in a current servo sample and thereby avoid unnecessarily jumping back and forth between algorithms.

5. The method of claim 1 wherein the first plurality of servo bursts comprises two servo bursts which are equally radially disposed on either side of a two-burst centerline.

6. The method of claim 5 wherein the step of determining whether to retain the first fractional track position operates by determining whether the read transducer is within a predetermined distance from the two-burst centerline.

7. The method of claim 2 wherein the step of determining whether to retain the first fractional track position operates by determining whether the first fractional track position calculated with the first algorithm is within a limit value.

8. The method of claim 7 wherein the limit value is varied based on which algorithm was used in a previous servo sample in order to increase the likelihood that the method will re-use the same algorithm in a current servo sample.

9. The method of claim 1 wherein the plurality of angularly sequential servo bursts comprises four angularly sequential servo bursts A, B, C, D that are each 100% of a track pitch in width and are radially arranged in a 100% quadrature servo pattern wherein two of the servo bursts A, B are equally radially disposed on either side of a "normal" two-burst centerline A/B that is substantially aligned with the centerline of a concentric data track and two of the servo bursts C, D are equally radially disposed on either side of a "quadrature" two-burst centerline C/D that is substantially offset from the centerline of the concentric data track by 50% of a track pitch.

10. The method of claim 9 wherein the first algorithm calculates the first fractional track position using only two of the four servo bursts A, B, C, D.

11. The method of claim 10 wherein the first algorithm calculates the first fractional track position relative to the A/B centerline using an (A−B) formula when the read transducer is determined to be in a first range of fractional positions and relative to the C/D centerline using a (C−D) formula when the read transducer is determined to be in a second range of fractional positions.

12. The method of claim 11 wherein the (A−B) formula is implemented substantially as (A−B)/(A+B) and wherein the (C−D) formula is implemented substantially as (C−D)/(C+D).

13. The method of claim 10 wherein the second algorithm calculates the second fractional track position using all four servo bursts A, B, C, D.

14. The method of claim 13 wherein N=A−B and Q=C−D and wherein the second algorithm calculates the second fractional track position with an (N−Q) formula when the read transducer is determined to be in a third range of fractional positions and with an (N+Q) formula when the read transducer is determined to be in a fourth range of fractional positions.

15. The method of claim 14 wherein the (N−Q) formula is implemented substantially as $$\frac{A-B}{A+B} - \frac{C-D}{C+D}$$

and wherein the (N+Q) formula is implemented substantially as $$\frac{A-B}{A+B} + \frac{C-D}{C+D}.$$

16. The method of claim 14 wherein the (N−Q) formula is implemented substantially as $$\frac{(A-B)-(C-D)}{A+B+C+D}$$

and wherein the (N+Q) formula is implemented substantially as $$\frac{(A-B)+(C-D)}{A+B+C+D}.$$

17. The method of claim 13 wherein the method further comprises the steps of:

dividing a repeating portion of the 100% quadrature servo pattern into a plurality of two-burst zones in which the fractional track position is calculable by the first algorithm using only two bursts and a plurality of four-burst zones in which the fractional track position is calculable by the second algorithm using all four bursts; and determining which zone was read by the read transducer based on relative values of the four servo bursts A, B, C, D.

18. The method of claim 17 wherein there are overlapping regions between the two-burst zones in which the fractional track position is calculable by the first algorithm using only two servo bursts and the four-burst zones in which the fractional track position is calculable by the second algorithm using all four bursts and further comprising the step of:

selecting between first and second algorithms based on the algorithm used in a previous servo sample.

19. The method of claim 17 wherein the repeating portion of the 100% quadrature servo pattern is divided into twelve zones.

20. A disk drive generating a fractional track position signal, comprising:

a base;

a data disk having a plurality of concentric data tracks;

a transducer head assembly including a read transducer;

a sampled servo control system for moving the transducer head over the data disk relative to the concentric data tracks;

a plurality of angularly sequential servo bursts on the data disk comprising four angularly sequential servo bursts A, B, C, D that are each 100% of a track pitch in width and are radially arranged in a 100% quadrature servo pattern wherein two of the servo bursts A, B are equally radially disposed on either side of a "normal" two-burst centerline A/B that is substantially aligned with the centerline of a concentric data track and two of the servo bursts C, D are equally radially disposed on either side of a "quadrature" two-burst centerline C/D that is substantially offset from the centerline of the concentric data track by 50% of a track pitch;

two-burst means for calculating a fractional track position with a first algorithm using only two of the four servo bursts A, B or C, D;

four-burst means for calculating a fractional track position with a second algorithm using all four servo bursts A, B, C, D;

means for dividing a repeating portion of the 100% quadrature servo pattern into a plurality of two-burst zones in which the fractional track position is calculable by the two-burst algorithm using only two bursts and a plurality of four-burst zones in which the fractional track position is calculable by the four-burst algorithm using all four bursts;

means for determining which zone was read by the read transducer based on relative values of the four servo bursts A, B, C, D; and means for selecting between the two-burst and four-burst means for calculating the fractional track position based on which zone was determined to be read by the read transducer.

21. The disk drive of claim 20, wherein there are overlapping regions between the two-burst zones in which the fractional track position is calculable by the first algorithm using only two servo bursts and the four-burst zones in which the fractional track position is calculable by the second algorithm using all four bursts, the disk drive further comprising:

means for selecting between two-burst and the four-burst calculating means based on the algorithm used in a previous servo sample.

22. The disk drive of claim 20 wherein the two-burst calculating means calculates the two servo bursts to calculate a fractional track position relative to the A/B centerline using an (A−B) formula when the read transducer is determined to be in a first range of fractional positions and relative to the C/D centerline using a (C−D) formula when the read transducer is determined to be in a second range of fractional positions.

23. The disk drive of claim 22 wherein the (A−B) formula is implemented substantially as (A−B)/(A+B) and wherein the (C−D) formula is implemented substantially as (C−D)/(C+D).

24. The disk drive of claim 20 wherein the four-burst calculating means calculates the fractional track position using all four servo bursts A, B, C, D, to calculate a fractional track position relative to an N−Q centerline using an (N−Q) formula when the read transducer is determined to be in a third range of fractional positions and relative to an N+Q centerline using an (N+Q) formula when the read transducer is determined to be in a fourth range of fractional positions.

25. The disk drive of claim 24 wherein the (N−Q) formula is implemented substantially as $$\frac{A-B}{A+B} - \frac{C-D}{C+D}$$

and wherein the (N+Q) formula is implemented substantially as $$\frac{A-B}{A+B} + \frac{C-D}{C+D}.$$

26. The disk drive of claim 24 wherein the (N−Q) formula is implemented substantially as $$\frac{(A-B)-(C-D)}{A+B+C+D}$$

and wherein the (N+Q) formula is implemented substantially as $$\frac{(A-B)+(C-D)}{A+B+C+D}.$$

27. A method of determining a fractional track position of a read transducer in a disk drive using a repeating pattern of four angularly sequential servo bursts A, B, C, D that are radially arranged in a 100% quadrature servo pattern wherein two of the servo bursts A, B are equally radially disposed on either side of a "normal" two-burst centerline A/B that is substantially aligned with the centerline of a concentric data track and two of the servo bursts C, D are equally radially disposed on either side of a "quadrature" two-burst centerline C/D that is substantially offset from the centerline of the concentric data track by 50% of a track pitch, the method comprising the steps of:

reading four servo bursts A, B, C, D for use in calculating a two-burst fractional track position relative to a two-burst centerline and in calculating a four-burst fractional track position relative to a four-burst centerline;

using a two-burst fractional track position to position the read transducer if the two-burst fractional track position is less than a limit value; and using a four-burst fractional track position to position the read transducer if the two-burst fractional track position is greater than the limit value.

28. The method of claim 27 further comprising the step of varying the limit value based on whether a two-burst or four-burst fractional track position was used to control the read transducer in a previous servo sample.

29. The method of claim 27 comprising the further steps of:

calculating the two-burst fractional track position;

determining if the two-burst fractional track position is less than the predetermined limit; and calculating the four-burst fractional track position only if the two-burst fractional track position is greater than the predetermined limit.

30. The method of claim 29 further comprising the step of varying the limit value based on whether a two-burst or four-burst fractional track position was used to control the read transducer in a previous servo sample.

31. The method of claim 27:

wherein the two-burst fractional track position is calculated relative to the A/B centerline using an (A−B)

formula when the read transducer is determined to be in a first range of fractional positions;

wherein the two-burst fractional track position is calculated relative to the C/D centerline using a (C−D) formula when the read transducer is determined to be in a second range of fractional positions;

wherein the four-burst fractional track position is calculated relative to an N−Q centerline using an (N−Q) formula when the read transducer is determined to be in a third range of fractional positions; and wherein the four-burst fractional track position is calculated relative to an N+Q centerline using an (N+Q) formula when the read transducer is determined to be in a fourth range of fractional positions.

* * * * *